United States Patent
Borges et al.

(10) Patent No.: US 9,719,224 B2
(45) Date of Patent: *Aug. 1, 2017

(54) AUTOMOTIVE VEHICLE SKID RECOVERY SYSTEM

(71) Applicant: International Business Machines Corporation, Armonk, NY (US)

(72) Inventors: Gabriel P. Borges, Sumaré (BR); Scott R. Crowther, LaGrangeville, NY (US); Abraham G. Guerra, Brewster, NY (US); Grant D. Miller, Superior, CO (US); Nader M. Nassar, Yorktown Heights, NY (US); Tamer M. Nassar, Yorktown Heights, NY (US)

(73) Assignee: International Business Machines Corproation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/737,569

(22) Filed: Jun. 12, 2015

(65) Prior Publication Data

US 2015/0284921 A1     Oct. 8, 2015

Related U.S. Application Data

(62) Division of application No. 13/455,179, filed on Apr. 25, 2012, now Pat. No. 9,139,175.

(51) Int. Cl.
*E01H 5/06* (2006.01)
*B60T 8/176* (2006.01)
(Continued)

(52) U.S. Cl.
CPC ............. *E01H 5/061* (2013.01); *B60T 8/176* (2013.01); *B60T 17/04* (2013.01); *E01H 5/06* (2013.01); *E01H 5/10* (2013.01)

(58) Field of Classification Search
CPC  E01H 5/06; E01H 5/061; E01H 5/062; E01H 5/065; E01H 5/066; E01H 5/067;
(Continued)

(56) References Cited

U.S. PATENT DOCUMENTS 287,583 A    10/1883 Royal
1,042,450 A  10/1912 Kerr
(Continued)

OTHER PUBLICATIONS

Nixon, W., "The Potential of Friction as A Tool for Winter Maintenance," IIHR Technical Report No. 392, Feb. 1998, 34 pages.
(Continued)

*Primary Examiner* — Thomas B Will
*Assistant Examiner* — Joan D Misa
(74) *Attorney, Agent, or Firm* — Gibb & Riley, LLC

(57) ABSTRACT

In a vehicle skid recovery system skid recovery can be accelerated when an automotive vehicle begins to skid as a result of ice accumulation on the road surface. The system can control operation of ice removers (e.g., blades or heaters), which are mounted within the wheel wells forward of the wheel, based on information received from the vehicle's outside temperature sensor and anti-lock braking system (ABS). When the temperature sensor indicates that the outside temperature is below a predetermined temperature and when the anti-lock braking system is activated as a result of detected skid, a controller activates the ice remover in one or more of the wheel wells and, thereby cause the ice remover to remove ice from the road surface forward of the corresponding wheel. Clearing the ice allows the vehicle's tires to gain traction on the road surface and, thereby stops the skid.

7 Claims, 7 Drawing Sheets

(51) Int. Cl.
*E01H 5/10* (2006.01)
*B60T 17/04* (2006.01)

(58) Field of Classification Search
CPC . E01H 5/04; B60R 19/54; B60T 8/176; B60T 17/04
USPC .......................... 37/263, 245, 227, 196, 268
See application file for complete search history.

(56) References Cited

U.S. PATENT DOCUMENTS

| | | | |
|---|---|---|---|
| 1,262,966 A | 4/1918 | Mahon |
| 1,269,016 A | 6/1918 | Staszko |
| 1,322,296 A | 11/1919 | Ethier |
| 1,383,409 A | 7/1921 | Liddell |
| 1,392,166 A | 9/1921 | Immer |
| 1,447,004 A | 2/1923 | Anthon |
| 1,498,690 A | 6/1924 | Heginbottom |
| 1,506,634 A | 8/1924 | Hartshorn |
| 1,586,786 A | 6/1926 | Davies |
| 1,635,043 A | 7/1927 | Hojnowski |
| 1,749,465 A | 3/1930 | Caskin |
| 1,805,933 A | 5/1931 | Victor |
| 1,885,611 A | 11/1932 | Lilley |
| 2,137,476 A | 11/1938 | Zimmerman |
| 2,582,136 A | 1/1952 | Koblas |
| 2,623,310 A | 12/1952 | Raught |
| 2,886,120 A | 5/1959 | Broell |
| 2,955,368 A | 10/1960 | Winsett |
| 3,289,668 A | 12/1966 | Drucker |
| 3,341,222 A | 9/1967 | Roberts |
| 3,544,370 A | 12/1970 | Wrede |
| 3,680,885 A | 8/1972 | DeCardi et al. |
| 3,800,447 A | 4/1974 | Harvey |
| 3,831,689 A | 8/1974 | Smith |
| 4,203,423 A | 5/1980 | Ricci |
| 4,261,115 A | 4/1981 | Chittenden |
| 4,263,729 A | 4/1981 | Minnen |
| 4,300,295 A | 11/1981 | Heismann |
| 4,324,307 A | 4/1982 | Schittino et al. |
| 4,665,636 A | 5/1987 | Borras |
| 4,805,323 A | 2/1989 | Motohashi |
| 4,834,320 A | 5/1989 | Tyson |
| 4,848,510 A | 7/1989 | Ahmed |
| 4,866,862 A | 9/1989 | Vu et al. |
| 5,058,295 A | 10/1991 | Holland |
| 5,301,996 A | 4/1994 | Theis |
| 5,573,686 A | 11/1996 | Lavicska |
| 5,603,172 A | 2/1997 | Maher |
| 5,813,150 A | 9/1998 | Feller et al. |
| 5,897,802 A | 4/1999 | Jones |
| 6,012,396 A | 1/2000 | Schulz |
| 6,134,813 A | 10/2000 | Vickers |
| 6,270,118 B1 | 8/2001 | Ichikawa |
| 6,371,532 B1 | 4/2002 | Skarie et al. |
| 6,564,479 B1 | 5/2003 | Vickers |
| 6,704,635 B2 | 3/2004 | Walenty et al. |
| 6,728,621 B1 | 4/2004 | Walenty et al. |
| 6,848,726 B1 | 2/2005 | Horsham |
| 6,938,829 B2 | 9/2005 | Doherty et al. |
| 6,946,621 B1 | 9/2005 | Roseman |
| 7,107,709 B2 | 9/2006 | Hamel |
| 7,234,730 B2 | 6/2007 | Bonutti |
| 7,421,334 B2 | 9/2008 | Dahlgren et al. |
| 7,467,485 B2 | 12/2008 | Lachance et al. |
| 7,469,444 B1 | 12/2008 | Thomas |
| 7,721,471 B2 | 5/2010 | Gamble, III |
| 8,528,237 B1 | 9/2013 | Bacall |
| 2002/0065594 A1 | 5/2002 | Squires et al. |

OTHER PUBLICATIONS http://insta-chain.com, 2012.
U.S. Appl. No. 13/455,179, Species Requirement dated Jun. 19, 2014, 5 pages.
U.S. Appl. No. 13/455,179, Office Action Communication dated Oct. 2, 2014, 16 pages.
U.S. Appl. No. 13/455,179, Office Action Communication dated Feb. 12, 2015, 10 pages.
U.S. Appl. No. 13/455,179, Advisory Action dated Apr. 22, 2015, 4 pages.
U.S. Appl. No. 13/455,179, Notice of Allowance dated May 18, 2015, 5 pages.

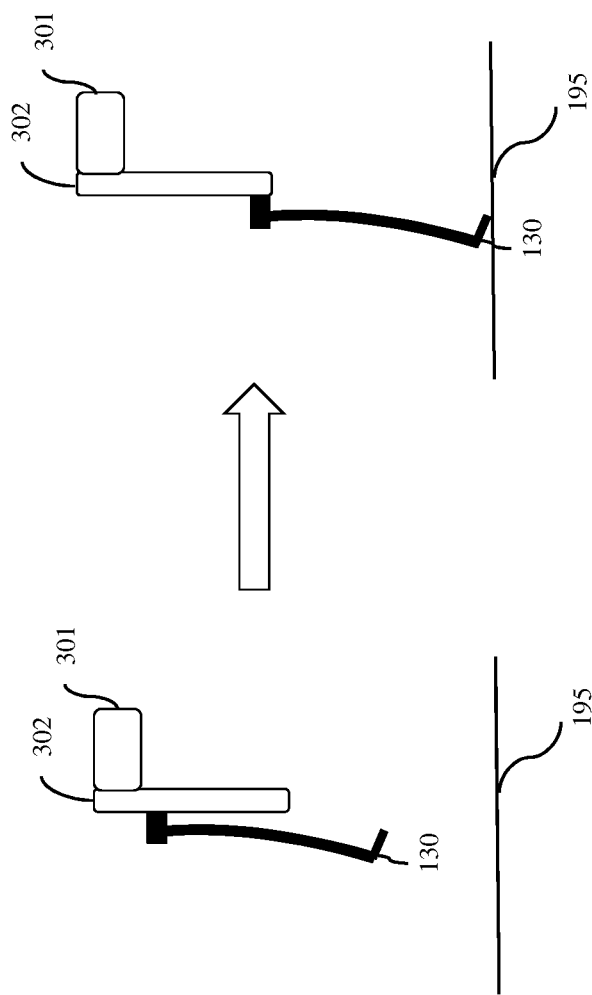

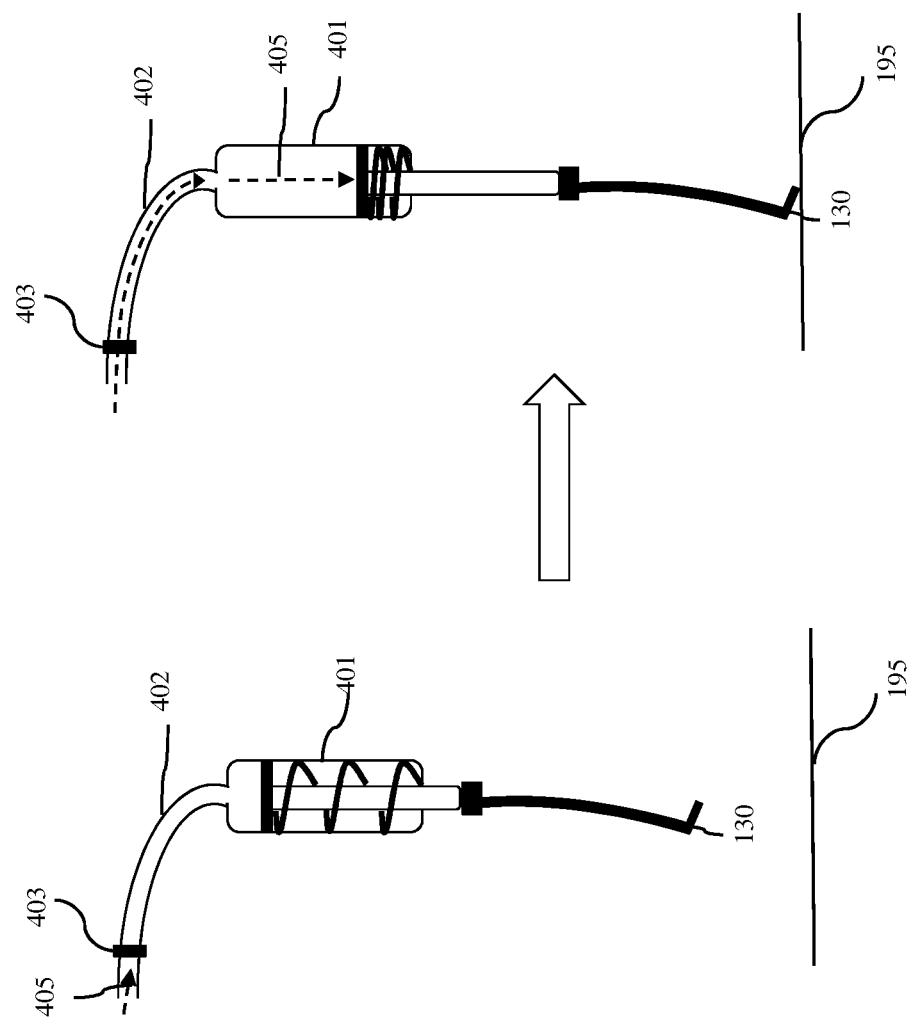

AUTOMOTIVE VEHICLE SKID RECOVERY SYSTEM

CROSS-REFERENCE TO RELATED APPLICATIONS

The present invention claims the benefit under 35 U.S.C. §120 as a divisional of presently pending U.S. patent application Ser. No. 13/455,179 filed on Apr. 25, 2012, the entire teachings of which are incorporated herein by reference.

BACKGROUND

The embodiments disclosed herein relate to automotive vehicle safety and, more particularly, to an automated system that assists with skid recovery, when an automotive vehicle begins to skid on an icy road surface.

DESCRIPTION OF THE RELATED ART

Conventional braking systems for automotive vehicles tend to fail when road surface conditions are icy. Specifically, when road conditions are icy, vehicles have a tendency to skid (i.e., slide) when the brakes are applied and, particularly, when they are applied suddenly. Such skidding, under icy conditions, is due to a low coefficient of friction between the tires of the vehicle and the road surface on which the vehicle is traveling. As ice accumulation increases, friction decreases and skidding occurs. For purposes of this disclosure, it should be understood that the term "automotive vehicle" refers to any self-propelled wheeled vehicle including, but not limited to, a car, a truck, a semi-truck, a sports utility vehicle, a van, a tractor, etc. Additionally, it should be understood that the term "ice" refers not only to solid ice, but also to any form of frozen precipitation containing ice particles such as snow, sleet, slush, hail, and freezing rain.

Vehicle safety under icy conditions has been addressed by governmental agencies that provide road maintenance crews that take measures (e.g., plowing, spreading salt, etc.) to limit and/or reduce ice accumulation. Vehicle safety under icy conditions has also been addressed by vehicle manufacturers, which have installed safety systems such as Anti-Lock Braking Systems (ABS). ABSs improve vehicle safety by overriding an unsafe action of a driver. Specifically, during a skid, it is safer for a driver to pump the brake pedal and, thereby the brakes rather than to press the brake pedal down continuously. If a skid occurs, the ABS will override a driver's unsafe action of slamming on the brakes (i.e., locking-up the brakes) and instead automatically operate the brakes in a safe manner by iteratively applying and releasing the brakes.

Unfortunately, the above-mentioned safety measures still do not solve the problem. Due to limited resources, oftentimes not all roads are maintained and, even when roads are designated for maintenance, maintenance crews may not be able to keep up with ever-worsening weather conditions. Furthermore, while ABS ensures that the driver of a vehicle doesn't make matters worse, it does not accelerate skid recovery in the presence of ice accumulation. Therefore, there is a need in the art for an automated system that is able to accelerate skid recovery, when an automotive vehicle begins to skid as a result of ice accumulation on the road surface.

SUMMARY

In view of the foregoing, disclosed herein are embodiments of an automotive vehicle skid recovery system (VSRS) able to accelerate skid recovery, when an automotive vehicle begins to skid as a result of ice accumulation on the road surface. Specifically, in the embodiments ice removers are mounted within the wheel wells of a vehicle forward of the wheels and operation of these ice removers is controlled based on information from the vehicle's outside temperature sensor and anti-lock braking system (ABS). When the temperature sensor indicates that the outside temperature is below a predetermined temperature (e.g., below freezing) and when the anti-lock braking system is activated as a result of detected skid, a controller can activate the ice remover in one or more of the wheel wells and, thereby cause the ice remover to remove ice from the road surface forward of the corresponding wheel. In one embodiment, the ice remover can comprise a blade (also referred to herein as a shovel blade or scraper), which is advanced toward the road surface and which comprises a scraping edge that displaces (i.e., scrapes away, moves) the ice. Clearing the ice from in front of the wheels allows the vehicle's tires to gain traction on the road surface and, thereby stops the skid. Alternatively, any other type of ice remover can be used (e.g., a heater than melts away the ice).

More particularly, disclosed herein are embodiments of an automotive vehicle skid recovery system (VSRS). In each of the embodiments, the vehicle skid recovery system (VSRS) can comprise at least a temperature sensor, an anti-lock braking system (ABS), an ice remover and a controller in communication with each of these other components. The temperature sensor can sense the temperature outside the vehicle. The anti-lock braking system can be operably connected to brakes on the vehicle and can be designed to detect skids and automatically operate the vehicle's brakes in a safe manner by iteratively applying and releasing the brakes. An ice remover can be mounted within a wheel well of the vehicle forward of the wheel contained therein. The controller can be operably connected to the ice remover and, when the anti-lock braking system is activated and the temperature is below a threshold temperature (e.g., below freezing), the controller can cause the ice remover to remove ice from the road surface just forward of the wheel.

In one embodiment of the vehicle skid recovery system (VSRS), the ice remover can comprise a blade (also referred to herein as a shovel blade or scraper) movably mounted within the wheel well. This blade can have a scraping edge. In this case, the controller can be operably connected to the blade and, when the anti-lock braking system is activated and the temperature is below the threshold temperature, the controller can cause the blade to move from a first position stowed within the wheel well to a second position and, particularly, a lower position close to the road surface, thereby allowing the scraping edge of the blade to displace the ice that is on the road surface just forward of the wheel. The blade in this embodiment can comprise any rigid material (e.g., metal, plastic, etc.) capable of maintaining its shape and suitable for scraping ice from the road surface. Optionally, the rigid material can be specifically selected so that it will break when pressure exerted against the blade is above a predetermined pressure threshold in order to avoid damaging the vehicle or the road surface. For example, the blade can be formed of a thermoplastic polyester material. Additionally or alternatively, this embodiment can further comprise a pressure sensor mounted on the blade. The pressure sensor can measure the amount of pressure exerted against the blade by the ice or any other material on the road surface. The controller can be in communication with the pressure sensor and can cause the blade to move a third position (e.g., higher or lower) based on the pressure.

In another embodiment of the vehicle skid recovery system (VSRS), the ice remover can comprise a heater (e.g., a forced hot air heater, an infrared heater, a laser heater, etc.) mounted within the wheel well. In this case, the controller can be operably connected to the heater and, when the anti-lock braking system is activated and the temperature is below the threshold temperature, the controller can cause the heater to turn on and, particularly, can cause the heater to direct heat toward the road surface, thereby melting the ice that is on the road surface just forward of the wheel.

BRIEF DESCRIPTION OF THE DRAWINGS

The embodiments herein will be better understood from the following detailed description with reference to the drawings, which are not necessarily drawn to scale and in which:

FIGS. 3A and 3B are drawings illustrating an exemplary mechanism for moving the blade-type ice remover from the first position shown in FIG. 2A to the second position shown in FIG. 2B, respectively;

FIGS. 4A and 4B are drawings illustrating another exemplary mechanism for moving the blade-type ice remover from the first position shown in FIG. 2A to the second position shown in FIG. 2B, respectively;

DETAILED DESCRIPTION

Figure 1:
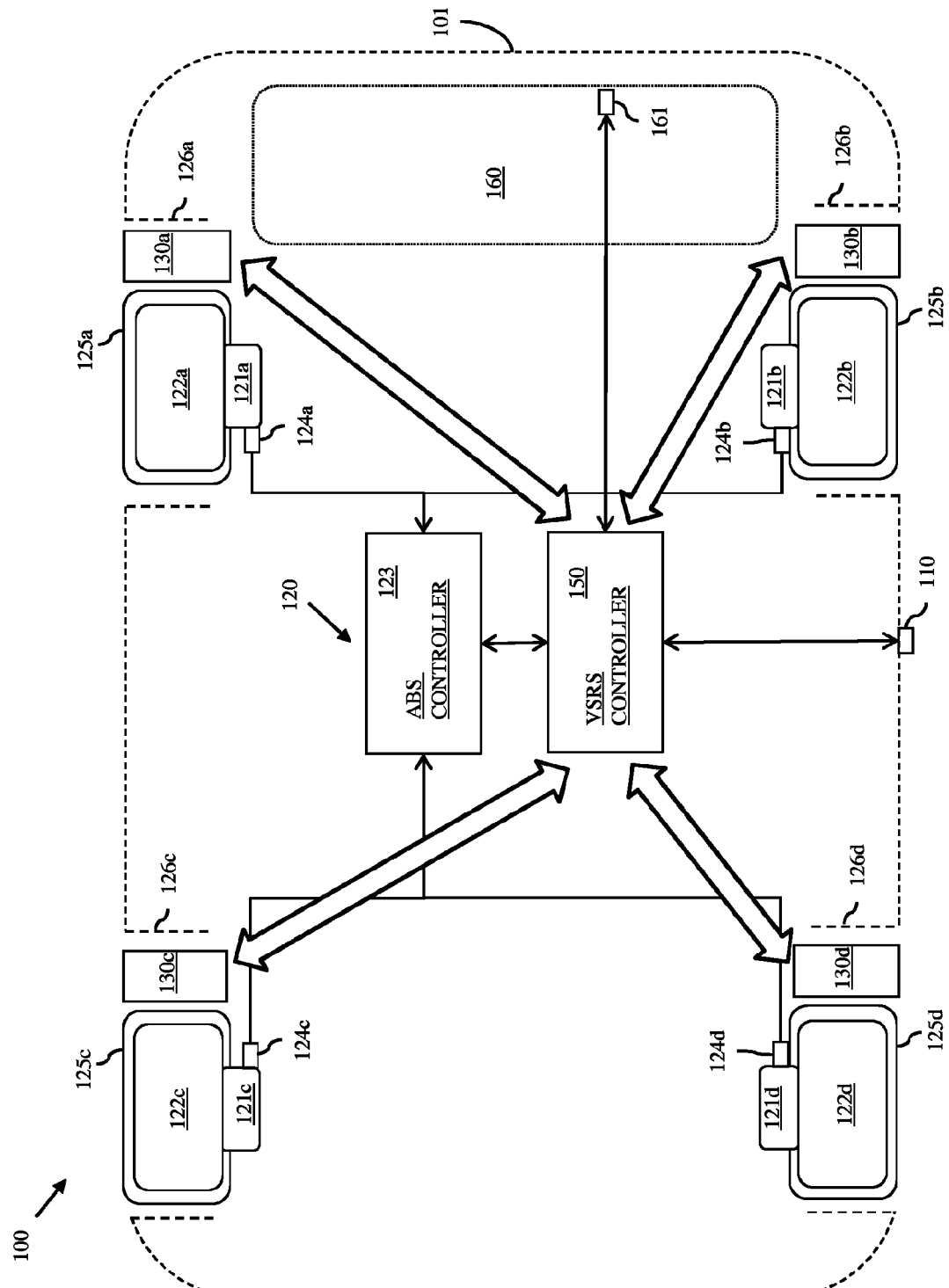
FIG. 1 is a schematic drawing illustrating an embodiment of an automotive vehicle skid recovery system (VSRS)

As mentioned above, conventional braking systems for automotive vehicles tend to fail when road surface conditions are icy. Specifically, when road conditions are icy, vehicles have a tendency to skid (i.e., slide) when the brakes are applied and, particularly, when they are applied suddenly. Such skidding, under icy conditions, is due to a low coefficient of friction between the tires of the vehicle and the road surface on which the vehicle is traveling. As ice accumulation increases, friction decreases and skidding occurs. For purposes of this disclosure, it should be understood that the term "automotive vehicle" refers to any self-propelled wheeled vehicle including, but not limited to, a car, a truck, a semi-truck, a sports utility vehicle, a van, a tractor, etc. Additionally, it should be understood that the term "ice" refers not only to solid ice, but also to any form of frozen precipitation containing ice particles such as snow, sleet, slush, hail, and freezing rain.

Vehicle safety under icy conditions has been addressed by governmental agencies that provide road maintenance crews that take measures (e.g., plowing, spreading salt, etc.) to limit and/or reduce ice accumulation. Vehicle safety under icy conditions has also been addressed by vehicle manufacturers, which have installed safety systems such as Anti-Lock Braking Systems (ABS). ABSs improve vehicle safety by overriding an unsafe action of a driver. Specifically, during a skid, it is safer for a driver to pump the brake pedal and, thereby the brakes rather than to press the brake pedal down continuously. If a skid occurs, the ABS will override a driver's unsafe action of slamming on the brakes (i.e., locking-up the brakes) and instead automatically operate the brakes in a safe manner by iteratively applying and releasing the brakes.

Unfortunately, the above-mentioned safety measures still do not solve the problem. Due to limited resources, oftentimes not all roads are maintained and, even when roads are designated for maintenance, maintenance crews may not be able to keep up with ever-worsening weather conditions. Furthermore, while ABS ensures that the driver of a vehicle doesn't make matters worse, it does not accelerate skid recovery in the presence of ice accumulation.

In view of the foregoing, disclosed herein are embodiments of an automotive vehicle skid recovery system (VSRS) able to accelerate skid recovery, when an automotive vehicle begins to skid as a result of ice accumulation on the road surface. Specifically, in the embodiments ice removers are mounted within the wheel wells of a vehicle forward of the wheels and operation of these ice removers is controlled based on information from the vehicle's outside temperature sensor and anti-lock braking system (ABS). When the temperature sensor indicates that the outside temperature is below a predetermined temperature (e.g., below freezing) and when the anti-lock braking system is activated as a result of detected skid, a controller can activate the ice remover in one or more of the wheel wells and, thereby cause the ice remover to remove ice from the road surface forward of the corresponding wheel. In one embodiment, the ice remover can comprise a blade (also referred to herein as a shovel blade or scraper), which is advanced toward the road surface and which comprises a scraping edge that displaces (i.e., scrapes away, moves) the ice. Alternatively, any other type of ice remover can be used (e.g., a heater than melts away the ice). Clearing the ice from in front of the wheels allows the vehicle's tires to gain traction on the road surface and, thereby stops the skid.

More particularly, referring to FIG. 1, disclosed herein are embodiments of a skid recovery system (VSRS) 100 for an automotive vehicle 101. In each of the embodiments, the automotive vehicle skid recovery system (VSRS) 100 can comprise at least a temperature sensor 110, an anti-lock braking system (ABS) 120, one or more ice removers (see ice removers 130a-d) and a vehicle skid recovery system (VSRS) controller 150 in communication with each of these other components.

The temperature sensor 110 can be mounted on the outside of the vehicle 101 and can sense (i.e., can be adapted to sense, can be configured to sense, etc.) the temperature outside the vehicle 101. Such temperature sensors are well known in the art and, thus, the details are omitted from this specification in order to allow the reader to focus on the salient aspects of the embodiments.

The anti-lock braking system 120 can detect skids (i.e., can be adapted to detect skids, can be configured to detect skids, etc.) and, when such skids are detected, can automatically operate (i.e., can be adapted to automatically operate, configured to automatically operate, etc.) the vehicle's brakes 121a-121d in a safe manner by iteratively applying and releasing the brakes 121a-121d. More specifically, the anti-lock braking system 120 can comprise any conventional anti-lock braking system. Exemplary anti-lock braking systems that can be incorporated into the vehicle skid recovery system (VSRS) disclosed herein include, but are not limited to, the anti-lock braking systems illustrated in U.S. Pat. No. 6,704,635 issued on Mar. 9, 2004 and U.S. Pat. No. 6,728,621 issued on Apr. 27, 2004, both of which are incorporated herein by reference in their entirety. In such anti-lock braking systems, the vehicle 101 comprises brakes 121a-121d (e.g., hydraulically activated friction brakes) that are operably connected to the vehicle wheels 122a-122d on which tires 125a-d, respectively, are mounted.

For purposes of illustration, the automotive vehicle 101 is illustrated and described herein as a 4-wheeled vehicle. However, it should be understood that, alternatively, the automotive vehicle 101 can comprise any automotive vehicle having two or more wheels.

In any case, a driver-actuated brake pedal can be coupled (e.g., mechanically or electrically) to a master cylinder that produces hydraulic pressure in proportion to the force applied by the driver to the brake pedal. Brake fluid supply lines can connect to each of the brakes 121a-d from the master cylinder. An anti-lock braking system controller 123 can receive various inputs from sensors 124a-d (e.g., wheel speed sensors) located at each wheel 122a-d and from any other additional sensors (e.g., from a brake pedal position sensor). The anti-lock braking system controller 123 can monitor these inputs to detect whether any one or more of the wheels are in a skid (i.e., whether the wheel(s) are skidding, whether the wheel(s) are locked such that they are no longer rotating, etc.). When a skid is detected in any of the wheels (e.g., in wheel 122a), the anti-lock braking system controller 123 will cause the brake fluid pressure in the brake fluid line to that wheel 122a to modulate in an attempt to maximize the tractive force between the tire 125a and the road surface. Current anti-lock braking systems typically allow such modulating pressure to be selectively applied to each wheel; however, alternatively, when a skid is detected in any one wheel, the brake fluid pressure in all of the brake fluid lines can be modulated.

An ice remover 130a-d can be mounted within a wheel well 126a-d of the vehicle 101 forward of the wheel 122a-d contained therein. For purposes of this disclosure, the term "wheel well" refers to the compartment within the vehicle frame or fender that houses a wheel. For purposes of illustration, ice removers 130a-d are shown as being mounted in each wheel well of the vehicle 101. However, alternatively, such ice removers 130a-d may be mounted in less than all of the wheel wells (e.g., in only the front wheel wells of a front wheel drive vehicle, in only the back wheel wells of a rear wheel drive vehicle, etc.). It should be understood that various different types of ice removers (i.e., ice removing mechanisms) can be incorporated into the disclosed vehicle skid recovery system (VSRS) 100, see detailed discussion below with regard to specific embodiments.

The vehicle skid recovery system (VSRS) controller 150 can be operably connected to the ice remover(s) 130a-d. As mentioned above, the vehicle skid recovery system (VSRS) controller 150 can be in communication with the temperature sensor 110 and, specifically, can receive (i.e., can be adapted to receive, can be configured to receive, etc.) outside temperature readings from the temperature sensor 110. The vehicle skid recovery system (VSRS) controller 150 can also be in communication with the anti-lock braking system 120 and, more particularly, with the anti-lock braking system controller 123 and can receive (i.e., can be adapted to receive, can be configured to receive, etc.), from the anti-lock braking system controller 123, an indication as to whether the anti-lock braking system 120 has been activated with respect to any of the wheels 121a-d. The vehicle skid recovery system (VSRS) controller 123 can monitor the information (i.e., can be adapted to monitor the information, can be configured to monitor the information, can be programmed to monitor the information, etc.) from the temperature sensor 110 and the anti-lock braking system 120 and, when the anti-lock braking system 120 is activated with respect to any given wheel (e.g., wheel 122a) and the temperature is below a threshold temperature, the vehicle skid recovery system (VSRS) controller 150 can cause the ice remover 130a to remove ice from the road surface just forward of that wheel 122a.

It should be noted that, depending upon the embodiment, when the anti-lock braking system 120 is activated with respect to any given wheel (e.g., wheel 122a) and the temperature is below the threshold temperature, the vehicle skid recovery system (VSRS) controller 150 can activate (i.e., can be adapted to activate, can be configured to activate, can be programmed to activate, etc.) all of the ice removers 130a-d on the vehicle 101 at the same time. Alternatively, the vehicle skid recovery system (VSRS) controller 150 can activate (i.e., can be adapted to activate, can be programmed to activate, can be configured to activate, etc.) only the specific ice remover 130a, which is associated with the skidding wheel 122a. Alternatively, the vehicle skid recovery system (VSRS) controller 150 can activate (i.e., can be adapted to activate, can be programmed to activate, can be configured to activate, etc.) only the specific ice remover 130a, which is associated with the skidding wheel 122a, and the corresponding ice remover 130b, which is associated with the wheel 122b on the opposite side of the vehicle 101.

The vehicle skid recovery system (VSRS) controller 150 can further deactivate or turn off (i.e., can be adapted to deactivate or turn off, can be programmed to deactivate or turn off, can be configured to deactivate or turn off, etc.) any activated ice removers upon receiving an indication from the anti-lock braking system controller 123 that anti-lock braking has been deactivated.

It should be noted that the predetermined temperature threshold, which is mentioned above and which triggers activation of the vehicle skid recovery system (VSRS) 100, can be set at the freezing temperature of water (i.e., 32° C.). Alternatively, this predetermined temperature threshold can be set slightly above the freezing temperature of water (e.g., 33°-36° C.). This slightly higher temperature threshold can account for the fact that airflow circulation on bridges or overpasses may cause sudden drops in temperature, which may not be instantaneously detectable by the temperature sensor 110. This slightly higher temperature threshold can also account for the fact that the ground temperature may actually be lower than the air temperature. Setting the predetermined temperature threshold at or just above the freezing temperature of water provides an indication that the likely cause of the skid is the accumulation of ice on the road surface and not some other cause. As mentioned above, the term "ice" refers not only to solid ice, but also any form of frozen precipitation containing ice particles such as snow, sleet, slush, hail, and freezing rain.

Optionally, the vehicle skid recovery system (VSRS) 100 can further comprise an activation switch 161 (also referred to herein as a manual override switch) contained within the vehicle cockpit 160 (e.g., on the dashboard, rearview mirror, center console or any other section of the cockpit within reach of the driver). For example, the vehicle skid recovery system (VSRS) activation switch 161 can be positioned adjacent to manual override switches for other systems (e.g., the airbag on/off switch). The vehicle skid recovery system (VSRS) controller 150 can be in communication with this switch 161 and can activate (i.e., can be adapted to activate, can be configured to activate, can be programmed to activate, etc.) the vehicle skid recovery system (VSRS) 100 only when the activation switch is "on".

For illustration purposes, the controllers 123 and 150 for the anti-lock braking system 120 and the vehicle skid recovery system (VSRS) 100, respectively, are shown in FIG. 1 as discrete controller units. However, it should be understood that, alternatively, such controllers 123 and 150 can be integrated into a single master controller. In either case, each of the discrete controllers or the single master controller can comprise a programmable, self-contained, dedicated mini-computer having a central processor unit (CPU), electronic data storage, etc.

As mentioned above, any number of different types of ice removers can be incorporated into the vehicle skid recovery system (VSRS) 100 of FIG. 1 disclosed herein.

Figure 2A:
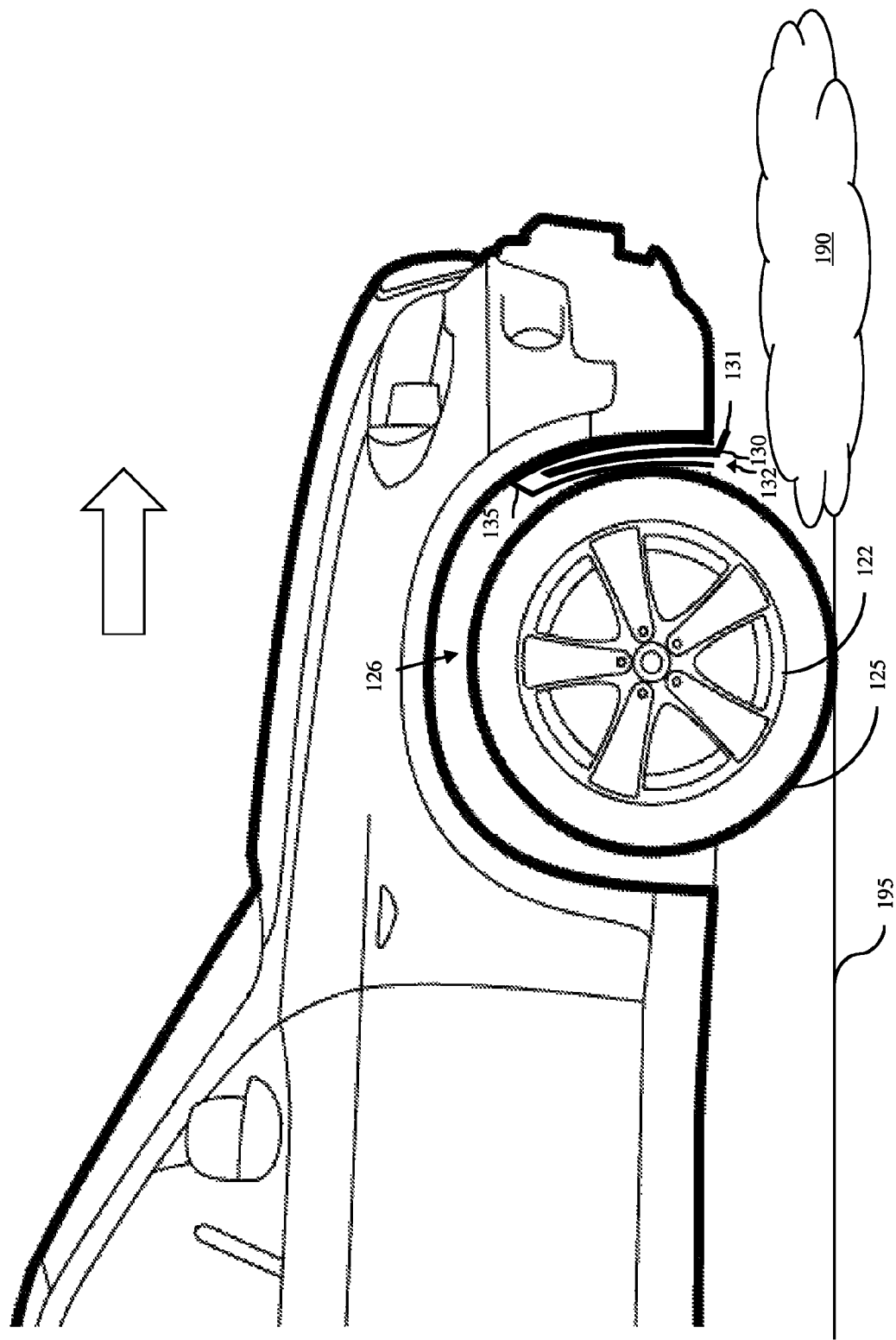
FIG. 2A is a drawing illustrating a blade-type ice remover that can be incorporated into the automotive vehicle skid recovery system (VSRS) of FIG. 1 and that is in a first position within the vehicle wheel well.
Figure 2B:
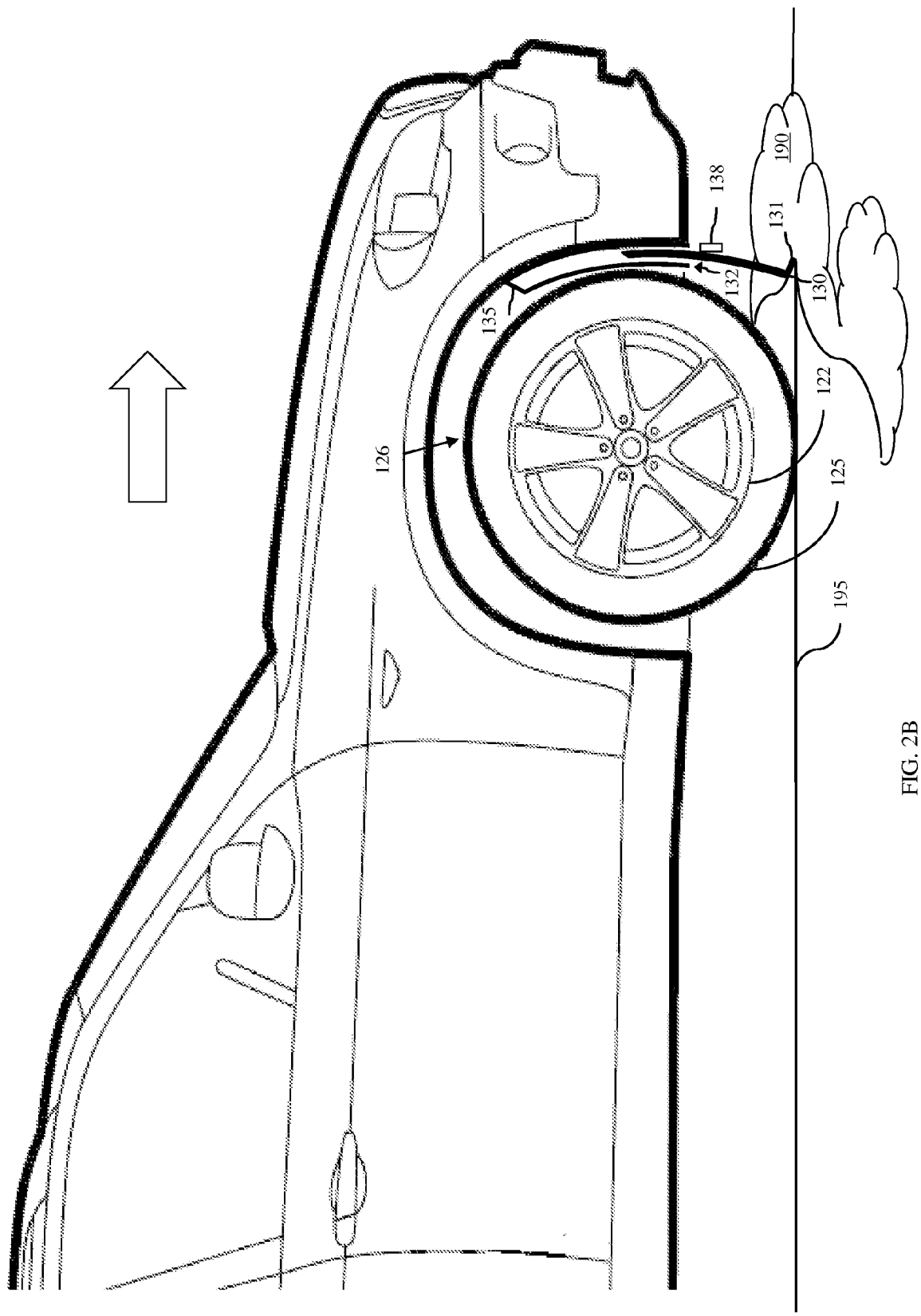
FIG. 2B is a drawing illustrating the blade-type ice remover of FIG. 2A a second position extended to the road surface for ice removal.

For example, referring to FIGS. 2A-2B in combination with FIG. 1, in one embodiment of the vehicle skid recovery system (VSRS) 100, the ice removers can each comprise a blade 130 (i.e., a shovel blade or scraper) movably mounted within a wheel well 126 forward of the wheel 122/tire 125. This blade 130 can be essentially vertically oriented within the wheel well 126 and can have a lower or scraping edge 131. In this case, the vehicle skid recovery system (VSRS) controller 150 can be operably connected to the blade 130 and, when the anti-lock braking system 120 is activated and the temperature is below the threshold temperature, the vehicle skid recovery system (VSRS) controller 150 can cause the blade 130 to move from a first position stowed within the wheel well 126 above the road surface 195 (as shown in FIG. 2A) to a second position and, particularly, to a lower position close to the road surface 195 (e.g., immediately adjacent to or within, for example, 1-4 cm of the road surface 195), thereby allowing the scraping edge 131 of the blade 130 to displace the ice 190 that is on the road surface 195 just forward of the wheel 122/tire 125. The vehicle skid recovery system (VSRS) controller 150 can further cause the blade 130 to move back to the first position stowed within the wheel well 126, when the anti-lock braking system (ABS) 120 is deactivated.

Movement of the blade 130 along a vertical axis between the first position (see FIG. 2A) and second position (see FIG. 2B) can be, for example, motor-controlled or hydraulic-controlled.

For example, in one embodiment as illustrated in FIGS. 3A-3B, the blade 130 can be connected to a track 302 mounted on an essentially vertical wall (not shown) of the wheel well 126. Movement of the blade 130 along the track 302 from the first position (see FIG. 3A) to the second position (see FIG. 3B) can be achieved through the use of a motor 301, which is connected to a power source (e.g., the vehicle battery, not shown) and which is operably controlled by the vehicle skid recovery system (VSRS) controller 150 (see FIG. 1).

Alternatively, in another embodiment as illustrated in FIGS. 4A-4B, a piston 401 can be operably connected to the blade 130. A line 402 (i.e., a hose) with pressurized fluid 405 can be connected to the piston 401 via a valve 403. The vehicle skid recovery system (VSRS) controller 150 (see FIG. 1) can be operably connected to the valve 403 and can actuate the blade 130 by opening the valve 403, thereby increasing the fluid pressure within the line 402 and piston 401 and causing the piston 401 to move the blade 130 from the first position (see FIG. 4A) to the second position (see FIG. 4B). Optionally, the line 402 can comprise a brake fluid line extension and the pressurized fluid 405 can comprise break fluid. It should be noted that if the pressure of the brake fluid rises and falls as a function of the anti-lock braking system (ABS) 120, the blade 130 can be allowed to rise and fall as well, thereby intermittently removing ice from the surface 195 forward of the wheel. Alternatively, a regulator (not shown) can be used to maintain fluid pressure within the piston once it rises to ensure that the blade 130 remains in the second position as shown in FIG. 4B until such time as the anti-lock braking system (ABS) 120 and, thereby, the vehicle skid recovery system (VSRS) 100 is deactivated.

Alternatively, movement of the blade 130 along a vertical axis between the first position (see FIG. 2A) and second position (see FIG. 2B) can be controlled using any other suitable technique.

Referring again to FIGS. 2A-2B, to ensure that the blade 130 and the various mechanisms that allow it to move vertically are protected from dirt and other road debris, the blade 130 can be mounted within a protective compartment 135 (e.g., a metal compartment) within the wheel well 126. The compartment 135 can have openings 132 (e.g., a bottom opening and a side opening (not shown)) allowing the blade to move from the first position (see FIG. 2A) to the second position (see FIG. 2B) and also allowing for blade replacement. It should be noted that the inside edges of the bottom opening 132 of the compartment 135 can optionally be lined (e.g., with rubber or with plastic bristles) to ensure that the blade 130 is allowed to pass through the opening 132 without also allowing dirt and other road debris from entering the compartment 135.

The blade 130 in this embodiment can comprise any rigid material (e.g., metal, plastic, etc.) capable of maintaining its shape and suitable for scraping ice 190 from the road surface 195. Optionally, the rigid material can be specifically selected so that it will break when pressure (e.g., as measured in foot/pounds) exerted against the blade is above a predetermined pressure threshold in order to avoid damaging the vehicle or the road surface. For example, the blade 130 can be formed of a thermoplastic polyester material. Thermoplastic polyesters are recyclable, rigid, clear and durable, with low water absorption and with good creep, heat, fatigue and solvent resistance.

Figure 5A:
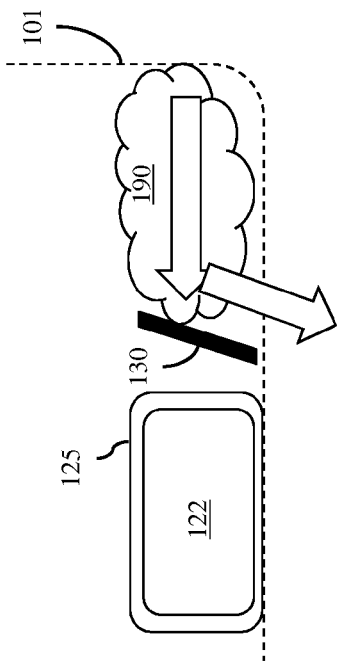
FIG. 5A is a top view diagram illustrating an exemplary blade-type ice remover with an angled shape.
Figure 5B:
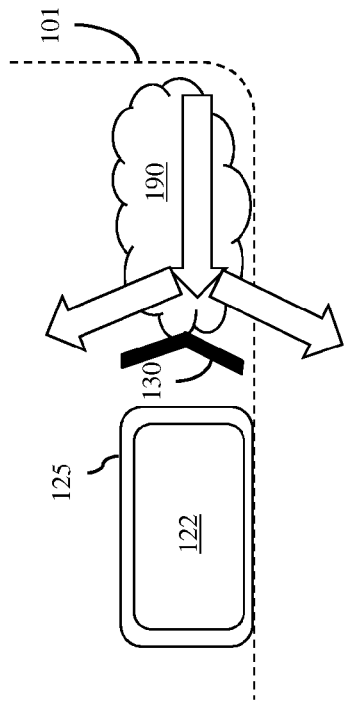
FIG. 5B is a top view diagram illustrating an exemplary blade-type ice remover with a chevron shape.
Figure 5C:
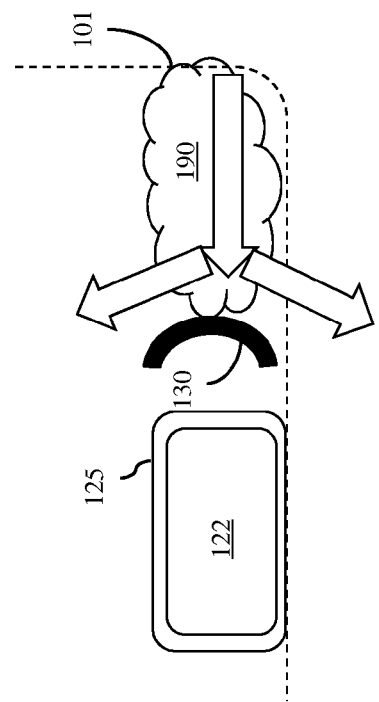
FIG. 5C is a top view diagram illustrating an exemplary blade-type ice remover with a curved shape.

Additionally, it should be noted that the blade 130 can have any number of different shapes. For example, as illustrated in FIG. 5A, the blade 130 can be angled such that the ice 190 displaced by the scraping edge is moved away from the vehicle 101. That is, the blade 130 can be rectangular in shape, but mounted on an angle (as shown) or, alternatively, the blade can be wedge shaped (not shown). Alternatively, the blade 130 can have a chevron-shape (see FIG. 5B), a triangular-shape (not shown), an arch-shape (see FIG. 5C), or any other suitable shape such that a first portion of the ice 190 displaced by the scraping edge is moved beneath the vehicle 101 (i.e., toward the center of the vehicle) and a second portion of the ice 190 displaced by the scraping edge is moved away from the vehicle.

Optionally, referring again to FIG. 2B, this embodiment can further comprise a pressure sensor 138 mounted on the blade 130. The pressure sensor 138 can measure the amount of pressure exerted against the blade 130 by the ice 190 or any other material on the road surface 195. The vehicle skid recovery system (VSRS) controller 150 of FIG. 1 can be in communication with the pressure sensor 138 and can cause the blade 130 to move a third position based on the pressure. For example, if the pressure is too high (i.e., above a predetermined high pressure threshold) the blade 130 can be moved up away from the surface 195 (e.g., back to the first position stowed within the wheel well 126 or to some other position wherein pressure on the blade 130 is reduced) in order to avoid damaging the blade 130, the vehicle 101 or the road surface 195. Alternatively, if the pressure is too low (i.e., below a predetermined low pressure threshold) the blade 130 can be moved down closer to the road surface 195 in order to better engage the ice 190 accumulating on the road surface.

Figure 6:
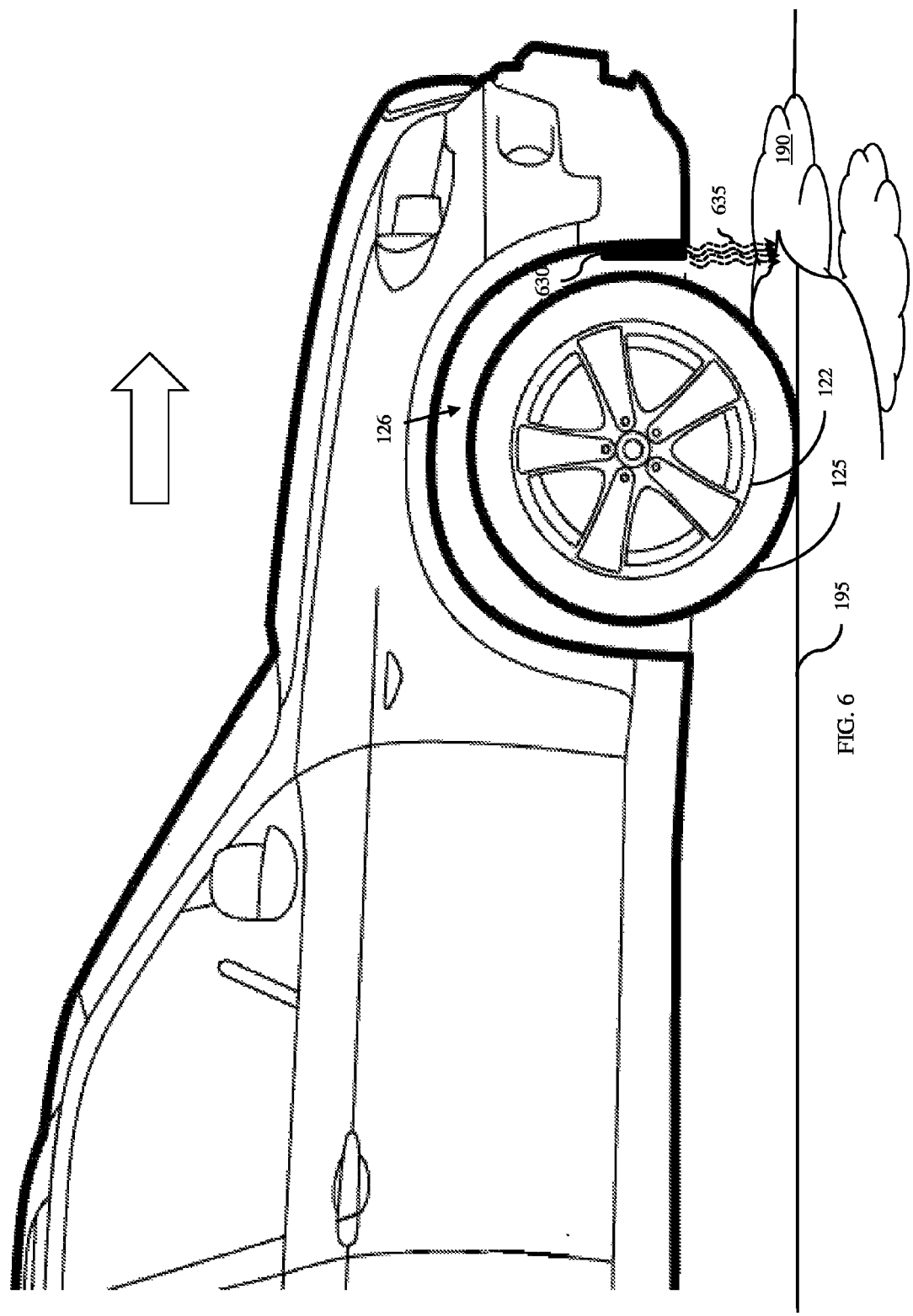
FIG. 6 is a drawing illustrating a heater-type ice remover that can be incorporated into the automotive vehicle skid recovery system (VSRS) of FIG. 1.

Referring to FIG. 6 in combination with FIG. 1, in another embodiment of the vehicle skid recovery system (VSRS) 100, the ice removers can each comprise a heater 630 (e.g., a forced hot air heater, an infrared heater, a laser heater, etc.) mounted within a wheel well 126. In this case, the vehicle skid recovery system (VSRS) controller 150 can be operably connected to the heater 630 and, when the anti-lock braking system (ABS) 120 is activated and the temperature is below the threshold temperature, the vehicle skid recovery system (VSRS) controller 150 can cause the heater 630 to turn on and, particularly, can cause the heater 630 to direct heat 635 toward the road surface 195, thereby melting the ice 190 that is on the road surface 195 just forward of the wheel 122/tire 125.

The above-discussed ice removers (e.g., blades and heaters) are offered for illustration purposes and are not intended to be limiting. It should be understood that, alternatively, any other suitable ice remover that can be mounted within the wheel well of a vehicle and that can remove ice from the road surface forward of the wheel can be incorporated into the vehicle skid recovery system (VSRS) 100 of FIG. 1.

It should further be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Therefore, disclosed herein are embodiments of an automotive vehicle skid recovery system (VSRS) able to accelerate skid recovery, when an automotive vehicle begins to skid as a result of ice accumulation on the road surface. Specifically, in the embodiments ice removers are mounted within the wheel wells of a vehicle forward of the wheels and operation of these ice removers is controlled based on information from the vehicle's outside temperature sensor and anti-lock braking system (ABS). When the temperature sensor indicates that the outside temperature is below a predetermined temperature (e.g., below freezing) and when the anti-lock braking system (ABS) is activated as a result of detected skid, a controller can activate the ice remover in one or more of the wheel wells and, thereby cause the ice remover to remove ice from the road surface forward of the corresponding wheel. In one embodiment, the ice remover can comprise a blade (also referred to herein as a shovel blade or scraper), which is advanced toward the road surface and which comprises a scraping edge that displaces (i.e., scrapes away, moves) the ice. Alternatively, any other type of ice remover can be used (e.g., a heater than melts away the ice). Clearing the ice from in front of the wheels allows the vehicle's tires to gain traction on the road surface and, thereby stops the skid.

What is claimed is:

1. A vehicle skid recovery system comprising:
a temperature sensor sensing a temperature outside a vehicle;
an anti-lock braking system operably connected to brakes on said vehicle;
a blade movably mounted within a wheel well of said vehicle forward of a wheel, said blade having a scraping edge;
a piston operably connected to said blade;
a brake fluid line extension containing brake fluid and connected by a valve to a brake fluid line of said vehicle;
a controller in communication with said temperature sensor and said anti-lock braking system,
said controller being operably connected to said valve and to said blade,
said controller causing said blade to move from a first position within said wheel well to a second position, when said anti-lock braking system is activated and said temperature is below a threshold temperature, said second position allowing said scraping edge to displace ice that is on a surface forward of said wheel, and
said controller causing said blade to move from said first position to said second position by opening said valve to increase brake fluid pressure within said brake fluid line extension and said piston such that said piston moves said blade from said first position to said second position; and,
a pressure sensor mounted on said blade, said pressure sensor measuring an amount of pressure being exerted against said blade by any one of said ice and other material and said controller being in communication with said pressure sensor and causing said blade to move to a third position based on said amount of said pressure.

2. The vehicle skid recovery system of claim 1, said brake fluid pressure rising and falling as a function of said anti-lock braking system such that said blade is intermittently moved away from said surface.

3. The vehicle skid recovery system of claim 1, said blade being angled such that said ice displaced by said scraping edge is moved away from said vehicle.

4. The vehicle skid recovery system of claim 1, said blade being essentially chevron-shaped such that a first portion of said ice displaced by said scraping edge is moved beneath said vehicle and a second portion of said ice displaced by said scraping edge is moved away from said vehicle.

5. The vehicle skid recovery system of claim 1, said blade being arched such that a first portion of said ice displaced by said scraping edge is moved beneath said vehicle and a second portion of said ice displaced by said scraping edge is moved away from said vehicle.

6. The vehicle skid recovery system of claim 1, said blade being movably mounted within a protective compartment within said wheel well, said compartment having openings allowing said blade to move from said first position to said second position and allowing for blade replacement.

7. The vehicle skid recovery system of claim 1, further comprising an activation switch on a cockpit of said vehicle, said controller being in communication with said activation switch and activating said vehicle skid recovery system only be when said activation switch is "on".

* * * * *

UNITED STATES PATENT AND TRADEMARK OFFICE
CERTIFICATE OF CORRECTION

PATENT NO. : 9,719,224 B2
APPLICATION NO. : 14/737569
DATED : August 1, 2017
INVENTOR(S) : Gabriel P. Borges et al.

It is certified that error appears in the above-identified patent and that said Letters Patent is hereby corrected as shown below:

In the Assignee item (73), replace International Business Machines Corproation, Armonk, NY (USA) with International Business Machines Corporation, Armonk, NY (USA)

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*